Figure 1:
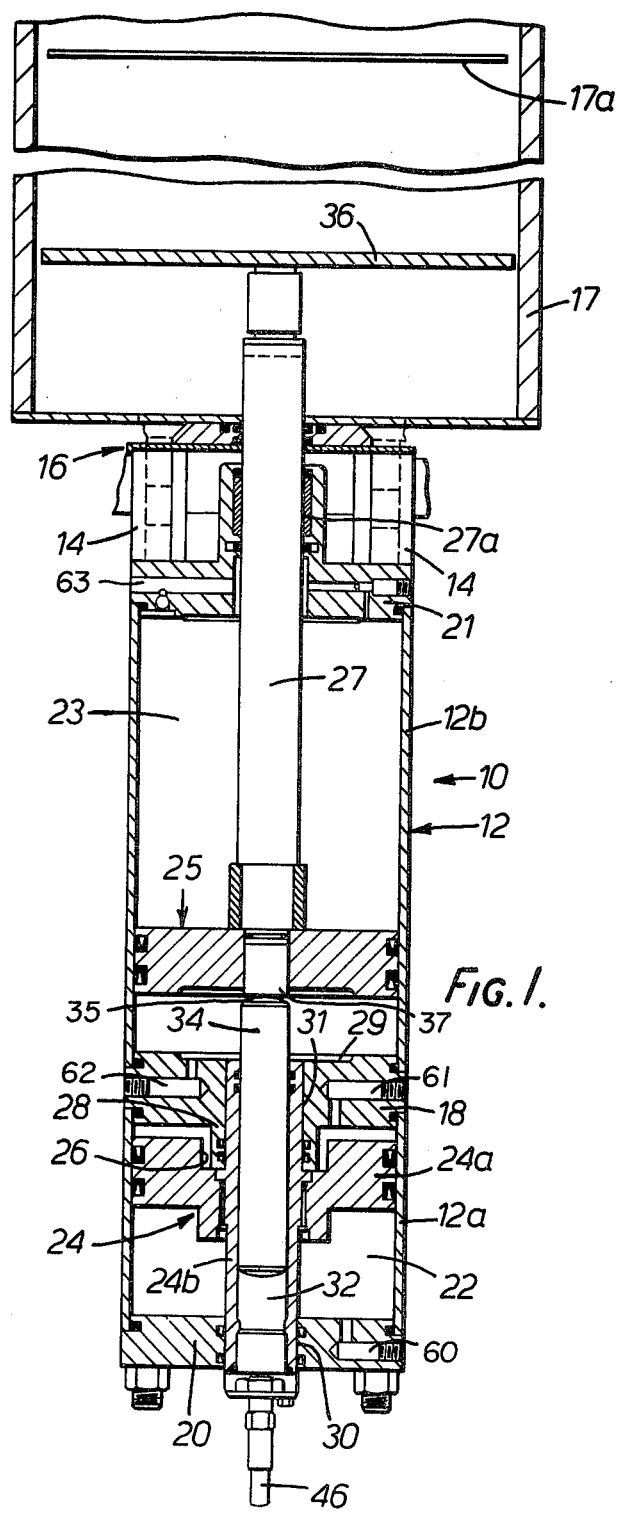

United States Patent [19]

Anderson

[11] 4,441,393

[45] Apr. 10, 1984

[54] METERING APPARATUS

[75] Inventor: Michael P. Anderson, Park Orchards, Australia

[73] Assignee: Kovan Engineering Pty. Ltd., Australia

[21] Appl. No.: 322,177

[22] Filed: Nov. 17, 1981

[30] Foreign Application Priority Data

Nov. 24, 1980 [AU] Australia ............................ PE1598

[51] Int. Cl.³ .............................................. B29F 1/06
[52] U.S. Cl. ...................................... 83/360; 83/370; 83/77; 177/208; 425/296
[58] Field of Search ......................... 83/360, 361, 363; 425/140, 141, 142, 296, 308; 264/404, 157; 177/208

[56] References Cited

U.S. PATENT DOCUMENTS

| | | | |
|---|---|---|---|
| 3,371,732 | 3/1968 | Stein | 177/208 |
| 3,425,503 | 2/1969 | Bullivant et al. | 177/208 |
| 3,955,243 | 5/1976 | Binder | 177/208 |
| 4,038,004 | 7/1977 | Hartmann | 425/140 |

*Primary Examiner*—E. R. Kazenske
*Assistant Examiner*—Hien H. Phan

*Attorney, Agent, or Firm*—Steele, Gould & Fried

[57] ABSTRACT

Metering apparatus includes a casing defining spaced first and second chambers and respective first and second piston members sealingly slidable by applied fluid pressure in the chambers. Support member coupled to and moveable with the second piston members projects from the casing to receive a load to be metered. Located within the first piston member is a third chamber in which a plunger is sealingly slidable. The second and third chambers are in communication whereby respective opposed transverse faces of the second piston members and the plunger are engageable to determine a limit position for the second piston means in the second chamber. In a preferred application, the metering apparatus is incorporated in a block forming machine, for example a cheese block forming machine, in which the load support platform is positioned within an upright housing to receive a column of a solid medium confined within the housing. Such machine further includes horizontally acting guillotine member to sever blocks from the column, the size of the block being determined by the limit position for the second piston member in the second chamber.

12 Claims, 2 Drawing Figures

METERING APPARATUS

This invention relates to metering apparatus, especially though not exclusively adaptable as a device for adjustably metering the displacement of a solid load.

One application of a device of the above-mentioned type is in cheese block forming machines of the kind in which successive commercial blocks of cheese are guillotined from the lower end of an upright column of fused milled curd. The curd column rests on a guillotine blade, which is periodically withdrawn to allow the column to be lowered on a platform to an extent such that the guillotine may be returned to sever a cheese block of substantially standard weight. The platform's descent, and accordingly the size and weight of the block, are determined by a metering device associated with the platform. In a known arrangement, the platform is supported upon a piston, the downward descent of which is arrested by contact with an upstanding detent pin. The detent pin is carried by a hinged arm and the position of the arm may be varied either manually or by a pneumatic ram pivoted to one end of the arm. This prior arrangement requires a separate mounting for the detent pin mechanism, which is difficult to access for adjustment and maintenance. The detent mechanism incorporates mechanical linkages and is susceptible to physical distortion.

It is an object of this invention to provide novel metering apparatus of a simple, reliable form which permits varied control movements of the metered load.

The invention accordingly provides metering apparatus comprising:

a casing defining spaced first and second chambers;

respective first and second piston means sealingly slidable by applied fluid pressure in the said chambers;

means coupled to and moveable with the second piston means, and projecting from the casing to receive a load to be metered;

a third chamber within said first piston means;

a plunger sealingly slidable in said third chamber;

wherein said second and said third chambers are in communication whereby respective opposed transverse faces of said second piston means and said plunger are engageable to determine a limit position for the second piston means in said second chamber.

In use of the apparatus, movement of the load may be controlled by the variation of fluid pressure, e.g. air pressure in the second chamber, but subject to a limit on the displacement of the load in one direction determined by the setting of the plunger. This limit position can be rapidly over-ridden when desired by variation of fluid pressure, e.g. air pressure, in the first chamber to move the first piston and thereby also the plunger with respect to the second chamber.

The apparatus preferably further comprises adjustment means operable to set the position of said plunger in said third chamber. In one embodiment, the adjustment means comprises a further casing displaced from the primary casing and defining a cavity which is in closed fluid flow communication with another transverse face of the plunger in said third chamber, and in which a further plunger is manipulably sealingly slidable. Alternatively, for example, the plunger may be coupled to gearing outside the third chamber by which the plunger may be displaced in the chamber.

In a preferred apparatus, according to the invention, said first and second pistons are axially symmetrical about a common axis and the first and second chambers are separated by a partition forming part of the casing. The first piston includes a tubular inner part which defines said third chamber and which sealingly slides in an opening through said partition.

Advantageously, a piston rod of the second piston means sealingly slidably projects from the casing and carries a load support platform externally of the casing.

The invention is also directed to a block forming machine, for example a cheese block forming machine, incorporating said metering apparatus, in which the load support platform is positioned within an upright housing to receive a column of a solid medium e.g. cheese curd confined within the housing, the machine further including horizontally acting guillotine means to sever blocks from the column, the size of the blocks being determined by said limit position for the second piston means in said second chamber.

Figure 2:
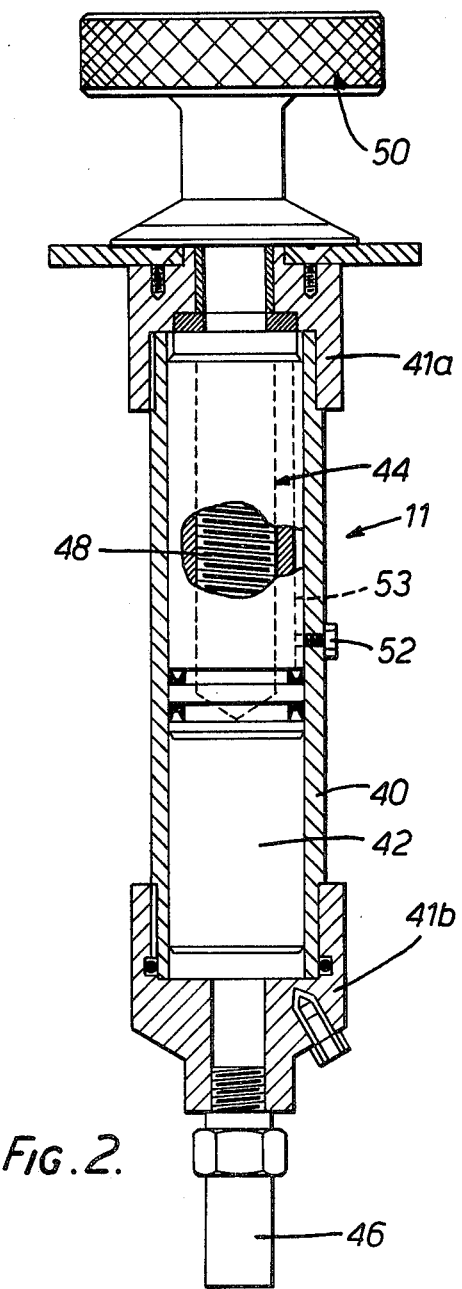

The invention will be further described, by way of example only, with reference to the accompanying drawings:

FIG. 1 is an axial cross section view of a first component of an exemplary metering installation; and, FIG. 2 is an axial cross-section view of a second component of an exemplary metering installation.

Component 10 comprises an annular casing 12 shown suspended, by cylindrical spacers 14 and associated screws, from a structural member 16 of plant in which the apparatus is to be employed. For purposes of illustration, this structural member consists of the base plate and/or pan of a cheese block forming machine, which further includes an upright square-section housing 17, for confining a column of cheese curd. Some distance above the pan is a retractable guillotine 17a for severing blocks of cheese from the curd column. There would also typically be provided a gate and opposed ram (not shown) for ejecting the severed blocks laterally from the housing.

Casing 12 consists of a pair of axially spaced cylinders 12a, 12b co-axially joined by a partition 18 and closed at their other ends by respective heads 20, 21. Cylinder 12a defines a first chamber 22 in which a two-part piston 24 is sealingly slidable, while cylinder 12b defines a longer, second, chamber 23 sealingly slidably housing a second piston 25.

Piston 24 includes an outer annular part 24a which sealingly slidably engages cylinder 12a and which is counter-bored at 26 to complement an integral boss 28 of partition 18. An inner part 24b of piston 24 consists of an elongate tube which is screw threadedly engaged with piston part 24a and is sealingly slidable in complementary openings 30, 31 in cylinder head 20 and partition 18. In the fully retracted position of piston 24, in which the shoulder of counterbore 26 abuts boss 18, tubular part 24b is almost flush with the exterior of head 20 and with a recessed face 29 on that end of partition 18 which faces chamber 23. The hollow interior of tubular piston part 24b constitutes a further chamber 32 in which a plunger 34 is sealingly slidable and which is in communication at its inner end with chamber 23.

Piston 25 sealingly slidably engages cylinder 12b and includes a piston rod 27. Rod 27 sealingly extends through cylinder head 21 within a bush 27a to project above pan 16 for securement to a load support platform 36 for the column of cheese curd. The lower end face 37 of piston rod 27 lies opposed to the end face 35 of plunger 34: it will be seen that end faces 35, 37 are engageable to determine a limit position for piston 25 in chamber 23, and thereby for platform 36, but that this limit position is adjustable by movement of plunger 34. Plunger 34 is thus adjustable either by direct sliding movement within tubular piston part 24b or by movement of the piston 24.

The second component 11 of the illustrated installation forms manipulable adjustment means and may be displaced some distance from the first component at a position which permits ready manual access. Indeed, the two may be quite remote from each other. Component 11 comprises a cylinder 40 with caps 41a, 41b defining a chamber 42 in which an annnular plunger 44 is sealingly slidable. One end of chamber 42 is placed in closed fluid flow communication with chamber 32 by a flexible conduit 46. Plunger 44 is threadably engaged by a screw 48 which projects through cap 41a and externally carries a knurled knob 50. Plunger 44 is finely axially displaceable within chamber 42 by manual rotation of knob 50, rotation of the plunger being prevented by a co-operating pin 52 and keyway 53. If the closed cavity comprising chambers 32, 42 and conduit 46 is filled with a substantially incompressible hydraulic fluid, it will be appreciated that knob 50 may be employed to set the effective position of plunger 34 within chamber 32.

For varying the differential fluid pressures across pistons 24, 25 to effect sliding movement of the pistons, casing 12 has various ports 60,61,62,63 for admitting/exhausting fluid, typically air, to or from chambers 22, 23. In use, the vertical position of piston 25, and therefore of platform 36, can be determined pneumatically by variation of the air pressure gradient in chamber 23, subject to a lower limit position set by engagement between the end faces 37,35 of piston rod 27 and plunger 34, the location of the plunger being determined by the setting of knob 50. FIG. 1 illustrates the platform 36 at this limit position. The versatility of the apparatus arises because the limit position may be rapidly and/or temporarily over-ridden pneumatically by adjusting the air pressure gradient in chamber 22 to cause piston 24 to be lowered, thereby to also lower plunger 34 away from end face 37 of piston rod 27. Platform 36 can thereby descend further until, for example, it strikes pan 16.

The utility of the inventive apparatus for cheese block forming machines will now be apparent. The curd column supported on platform 36 can be lowered to a fixed but adjustable limit position which is emperically pre-set by way of knob 50 to obtain a standardised weight of the particular cheese below the guillotine. The platform can be lowered pneumatically to the limit position at an appropriate rate and then, also by pneumatic action on piston 25, can be slightly raised to pressurize the guillotined block. For ejection of the freshly formed block, piston 24 can be caused to descend to lower platform 36 below the limit position for lateral ejection of the block by the aforementioned ram.

I claim:

1. Metering apparatus comprising: a casing defining spaced first and second chambers; respective first and second piston means sealingly slidable by applied fluid pressure in the said chambers; means coupled to and moveable with the second piston means, and projecting from the casing to receive a load to be metered; a third chamber within said first piston means; a plunger sealingly slidable in said third chamber; wherein said second and said third chambers are in communication whereby respective opposed transverse faces of said second piston means and said plunger are engageable to determine a limit position for the second piston means in said second chamber.

2. Metering apparatus according to claim 1 further comprising adjustment means operable to set the position of said plunger in said third chamber.

3. Metering apparatus according to claim 2 wherein said adjustment means comprises a further casing displaced from the primary casing and defining a cavity which is in closed fluid flow communication with another transverse face of the plunger in said third chamber, and in which a further plunger is manipulably sealingly slidable.

4. Metering apparatus according to claim 2 wherein said plunger in the third chamber is coupled to gearing outside the third chamber by which the plunger may be displaced in the chamber.

5. Metering apparatus according to any one of the preceding claims wherein said first and second pistons are axially symmetrical about a common axis and the first and second chambers are separated by a partition forming part of the casing.

6. Metering apparatus according to claim 5 wherein, said first piston includes a tubular inner part which defines said third chamber and which sealingly slides in an opening through said partition.

7. Metering apparatus according to claim 5 wherein said casing is a cylinder provided with opposed heads and ports for admitting/exhausting fluid to or from the first and second chambers to effect sliding movement of the respective piston means.

8. Metering apparatus according to claim 2 wherein a piston rod of said second piston means sealingly slidably projects from the casing and carries a load support platform externally of the casing.

9. Metering apparatus according to claim 8, wherein said first and second pistons are axially symmetrical about a common axis and the first and second chambers are separated by a partition forming part of the casing.

10. Metering apparatus according to claim 9 wherein, said first piston includes a tubular inner part which defines said third chamber and which sealingly slides in an opening through said partition.

11. A block forming machine incorporating metering apparatus according to claim 8, 9 or 10 in which the load support platform is positioned within an upright housing to receive a column of a solid medium confined within the housing, the machine further including horizontally acting guillotine means to sever blocks from the column, the size of the blocks being determined by said limit position for the second piston means in said second chamber.

12. A block forming machine according to claim 11 in use to form blocks of cheese from a said column of curd.

* * * * *